United States Patent
Nagai et al.

(10) Patent No.: US 7,145,925 B2
(45) Date of Patent: Dec. 5, 2006

(54) LASER OSCILLATION APPARATUS, EXPOSURE APPARATUS, SEMICONDUCTOR DEVICE MANUFACTURING METHOD, SEMICONDUCTOR MANUFACTURING FACTORY, AND EXPOSURE APPARATUS MAINTENANCE METHOD

(75) Inventors: Yoshiyuki Nagai, Tochigi (JP); Naoto Sano, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 10/930,745

(22) Filed: Sep. 1, 2004

(65) Prior Publication Data
US 2005/0030987 A1 Feb. 10, 2005

Related U.S. Application Data

(62) Division of application No. 09/839,139, filed on Apr. 23, 2001, now Pat. No. 6,870,865.

(30) Foreign Application Priority Data
Apr. 26, 2000 (JP) ............................. 2000-126502

(51) Int. Cl.
*H01S 3/13* (2006.01)
(52) U.S. Cl. ................... 372/29.02; 372/32; 372/20; 372/25; 372/33
(58) Field of Classification Search ............. 372/29.02, 372/32, 20, 25, 33, 57
See application file for complete search history.

(56) References Cited

U.S. PATENT DOCUMENTS

| 4,905,041 | A | 2/1990 | Aketagawa | 355/53 |
|---|---|---|---|---|
| 5,142,543 | A | 8/1992 | Wakabayashi et al. | 372/32 |
| 5,373,515 | A | 12/1994 | Wakabayashi et al. | 372/20 |
| 5,420,877 | A | 5/1995 | Sandstrom | 372/34 |
| 5,748,316 | A * | 5/1998 | Wakabayashi et al. | 356/519 |
| 5,838,426 | A | 11/1998 | Shinonaga et al. | 355/52 |
| 6,078,599 | A | 6/2000 | Everage et al. | 372/20 |
| 6,252,650 | B1 * | 6/2001 | Nakamura | 355/69 |
| 6,434,173 | B1 | 8/2002 | Tuganov et al. | 372/9 |
| 6,870,865 | B1 * | 3/2005 | Nagai et al. | 372/32 |
| 7,031,364 | B1 * | 4/2006 | Sano et al. | 372/55 |
| 2002/0141464 | A1 * | 10/2002 | Bushida et al. | 372/32 |
| 2003/0142715 | A1 * | 7/2003 | Nagai | 372/55 |

FOREIGN PATENT DOCUMENTS

| EP | WO 86/00427 | 1/1986 |
|---|---|---|
| EP | 0 570 243 A1 | 11/1993 |
| EP | 0 742 492 A1 | 11/1996 |

OTHER PUBLICATIONS

European Search Report dated Oct. 28, 2003, issued in corresponding European patent application No. 10 30 3730, forwarded in Communication dated Nov. 6, 2003.

\* cited by examiner

*Primary Examiner*—Minsun Oh Harvey
*Assistant Examiner*—Delma R. Flores Ruiz
(74) *Attorney, Agent, or Firm*—Fitzpatrick, Cella, Harper & Scinto

(57) ABSTRACT

A laser oscillation apparatus includes a wavelength change unit for driving a wavelength selection element in a band-narrowing module and changing the oscillation wavelength of a laser beam to a target value, and an oscillation history memory for storing the oscillation state of the laser beam as an oscillation history. The wavelength change unit drives the wavelength selection element on the basis of the oscillation history and changes the oscillation wavelength of the laser beam to the target value.

10 Claims, 11 Drawing Sheets

SEMICONDUCTOR DEVICE MANUFACTURING FLOW

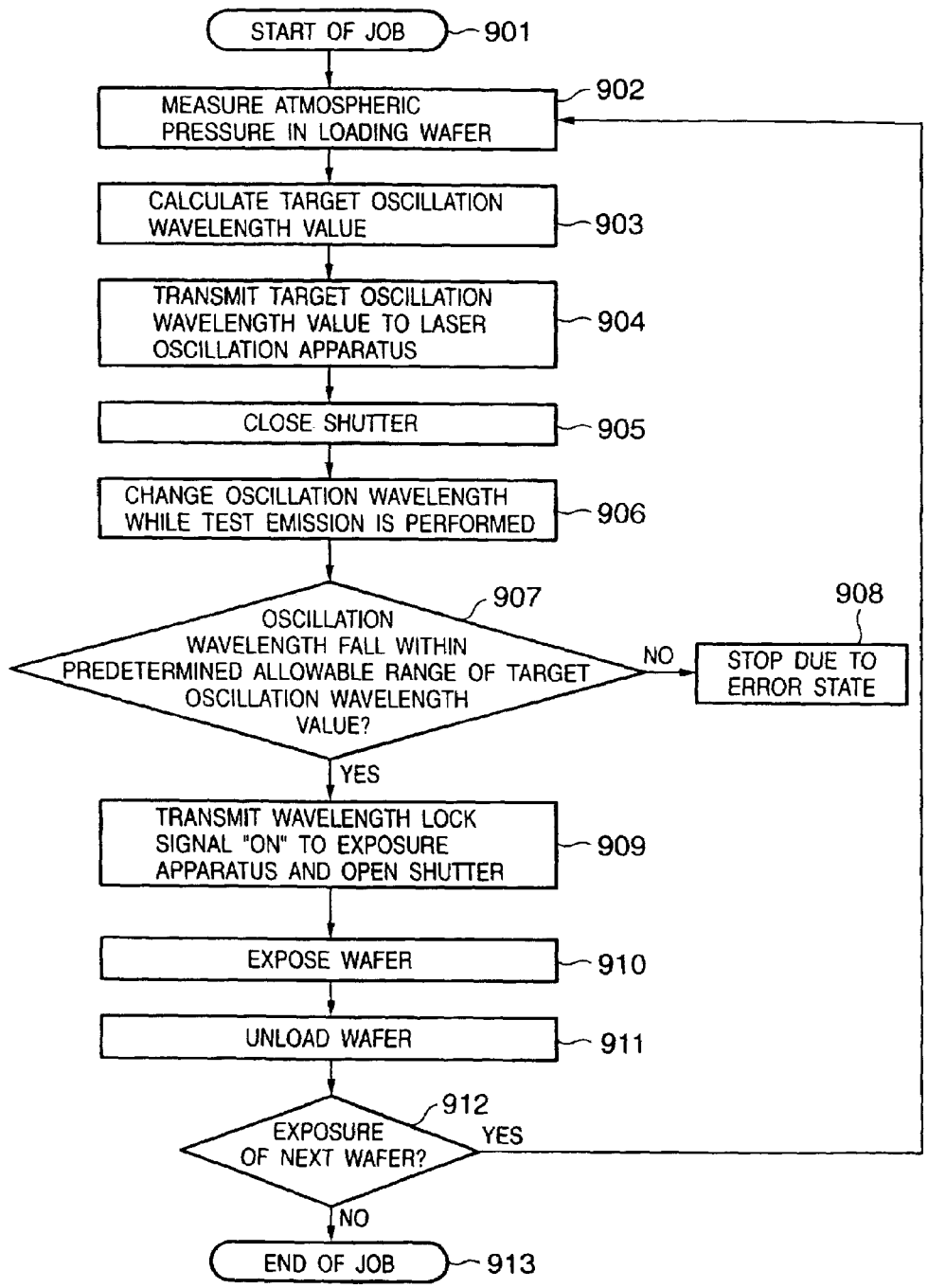

LASER OSCILLATION APPARATUS, EXPOSURE APPARATUS, SEMICONDUCTOR DEVICE MANUFACTURING METHOD, SEMICONDUCTOR MANUFACTURING FACTORY, AND EXPOSURE APPARATUS MAINTENANCE METHOD

This application is a divisional application of U.S. patent application Ser. No. 09/839,139, filed Apr. 23, 2001 now U.S. Pat. No. 6,870,865.

FIELD OF THE INVENTION

The present invention relates to a laser oscillation apparatus capable of changing the oscillation wavelength of, e.g., a laser beam, an exposure apparatus using the same, a semiconductor device manufacturing method, a semiconductor manufacturing factory, and an exposure apparatus maintenance method.

BACKGROUND OF THE INVENTION

Step & repeat type or step & scan type exposure apparatuses play a dominant role in the semiconductor integrated circuit manufacturing process. Such an exposure apparatus exposes the surface of a substrate (to be referred to as a wafer hereinafter) coated with a resist to the circuit pattern of a mask or reticle (to be referred to as a reticle hereinafter) via a projection lens. Recently, the integration degree of semiconductor integrated circuits is increasing. Along with this, demands have arisen for a light source for emitting exposure light having a shorter wavelength. In particular, a rare gas hydride excimer laser (to be referred to as an excimer laser hereinafter) as a kind of laser oscillation apparatus is receiving a great deal of attention as an ultraviolet high-output laser.

An exposure apparatus is generally used in a clean room. As the atmospheric pressure in the clean room changes upon changes in weather, the refractive index of exposure light changes, and the imaging position of a circuit pattern varies. In general, an excimer laser for the exposure apparatus can change the oscillation wavelength within the range of about 300 to 400 pm. The refractive index of exposure light changes depending on the wavelength. For this reason, the atmospheric pressure in the use environment of the exposure apparatus is measured at a proper timing such as the start of a job or exchange of a wafer, an optimal oscillation wavelength which should be oscillated to cancel variations in imaging position caused by a change in atmospheric pressure is calculated, and the oscillation wavelength of the excimer laser is changed by a desired amount. In this manner, the exposure apparatus copes with a change in atmospheric pressure in the use environment of the exposure apparatus.

This exposure apparatus performs exposure by a processing flow as shown in FIG. 12.

After the start of a job (step 901), the atmospheric pressure near the projection lens is measured at a proper timing such as a wafer loading timing (step 902). The main controller of the exposure apparatus calculates an oscillation wavelength (target oscillation wavelength value) optimal for exposure on the basis of the atmospheric pressure (step 903). The target oscillation wavelength value is transmitted to an excimer laser controller (step 904). An excimer laser oscillation apparatus closes a shutter arranged at an excimer laser exit port (step 905). The excimer laser controller emits a test excimer beam while oscillating a pulse beam, and adjusts the oscillation wavelength within a predetermined allowable range by using a wavelength change means while monitoring the oscillation wavelength by using the internal optical measurement unit of the excimer laser oscillation apparatus (step 906).

The laser oscillation apparatus checks whether the oscillation wavelength falls within a predetermined allowable range of a predetermined target oscillation wavelength value (step 907). If NO in step 907, the excimer laser changes to an error state and stops oscillation (step 908). If YES in step 907, the laser oscillation apparatus transmits a wavelength lock signal "ON" representing this to the exposure apparatus, opens the shutter (step 909), and starts exposure in accordance with an emission signal from the exposure apparatus (step 910). After exposure, the wafer is unloaded (step 911), and whether to expose the next wafer is determined (step 912). If NO in step 912, the job ends (step 913); if YES, the flow returns to step 902.

In the prior art, every time the oscillation wavelength is changed, the shutter must be closed to emit a test laser beam in order to confirm whether the changed oscillation wavelength reaches a target value. Shutter opening/closing operation and test emission decrease the productivity of the exposure apparatus.

SUMMARY OF THE INVENTION

The present invention has been made in consideration of the above situation, and has as its object to provide an exposure apparatus for always exposing a wafer to a circuit pattern with high precision without decreasing the productivity of the exposure apparatus when a laser oscillation apparatus is used as the light source of the exposure apparatus, a semiconductor device manufacturing method, a semiconductor manufacturing factory, and an exposure apparatus maintenance method.

To achieve the above object, according to the present invention, a laser oscillation apparatus is characterized by comprising wavelength change means for driving a wavelength selection element and changing an oscillation wavelength of a laser beam to a target value, wherein the wavelength change means calculates a driving amount of the wavelength selection element on the basis of the target value, drives the wavelength selection element on the basis of the calculated driving amount of the wavelength selection element, and changes the oscillation wavelength of the laser beam to the target value. The wavelength change means desirably calculates the driving amount of the wavelength selection element on the basis of an oscillation history, drives the wavelength selection element on the basis of the calculated driving amount of the wavelength selection element, and changes the oscillation wavelength of the laser beam to the target value. The wavelength selection element desirably includes one of a grating and etalon.

According to the experiments by the present inventors, the wavelength of a laser beam is unstable and drifts immediately after the start of laser oscillation or at several ten to several hundred pulses from the start of a burst in burst oscillation, and the drift amount changes depending on the laser oscillation history or the internal environment of a wavelength measurement unit in a laser oscillation apparatus. The oscillation history includes the wavelength change width, the elapsed time after the stop of oscillation and the oscillation duty (the ratio of oscillation time/idle time). The internal environment of the wavelength measurement unit includes the atmospheric pressure and temperature. A laser oscillation apparatus of the present invention more preferably incorporates one or both of an oscillation history of a laser beam and an internal wavelength measurement unit environment of the wavelength measurement unit. The drift amount of the wavelength measurement unit in the laser oscillation apparatus is calculated by using at least one of the oscillation history stored in the oscillation history memory means and the measurement result of the internal wavelength measurement unit environment measurement means. A wavelength adjustment means is preferably driven and controlled in consideration of the calculation result so as to oscillate a laser beam with a wavelength falling within a predetermined allowable range of a target wavelength.

It is difficult to adjust the wavelength immediately after the start of oscillation to a desired range when the laser oscillation idle time is long or the wavelength change amount is very large. It may also become difficult to determine whether the laser oscillation apparatus normally oscillates a laser beam with a desired allowable range. Thus, a desirable form of the laser oscillation apparatus according to the present invention adopts a wavelength lock signal transmission function of transmitting a signal used to determine whether the oscillation wavelength falls within a predetermined allowable range. A threshold is set for one or both of the oscillation wavelength change amount and the elapsed time after the stop of oscillation. The state of the wavelength lock signal is determined based on the threshold.

An exposure apparatus according to the present invention uses the laser oscillation apparatus of the present invention as a light source, and starts exposure without executing test emission for confirming whether the wavelength falls within a predetermined allowable range. If the wavelength change amount is very large or the oscillation idle time is very long or if the wavelength does not fall within the predetermined allowable range due to any reason, the laser oscillation apparatus outputs a wavelength lock signal used to determine whether the wavelength is adjusted to the predetermined range. The exposure apparatus determines based on the wavelength lock signal whether to perform test emission by the gas laser oscillation apparatus. The exposure apparatus of the present invention may change the wavelength not only in exchange of one wafer but between the end of exposure to a given exposure region and the start of exposure to the next exposure region.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 is a flow chart showing a conventional flow from the start to the end of a job.

DETAILED DESCRIPTION OF THE PREFERRED EMBODIMENTS

Preferred embodiments of the present invention will be described in detail below with reference to the accompanying drawings.

Figure 1:
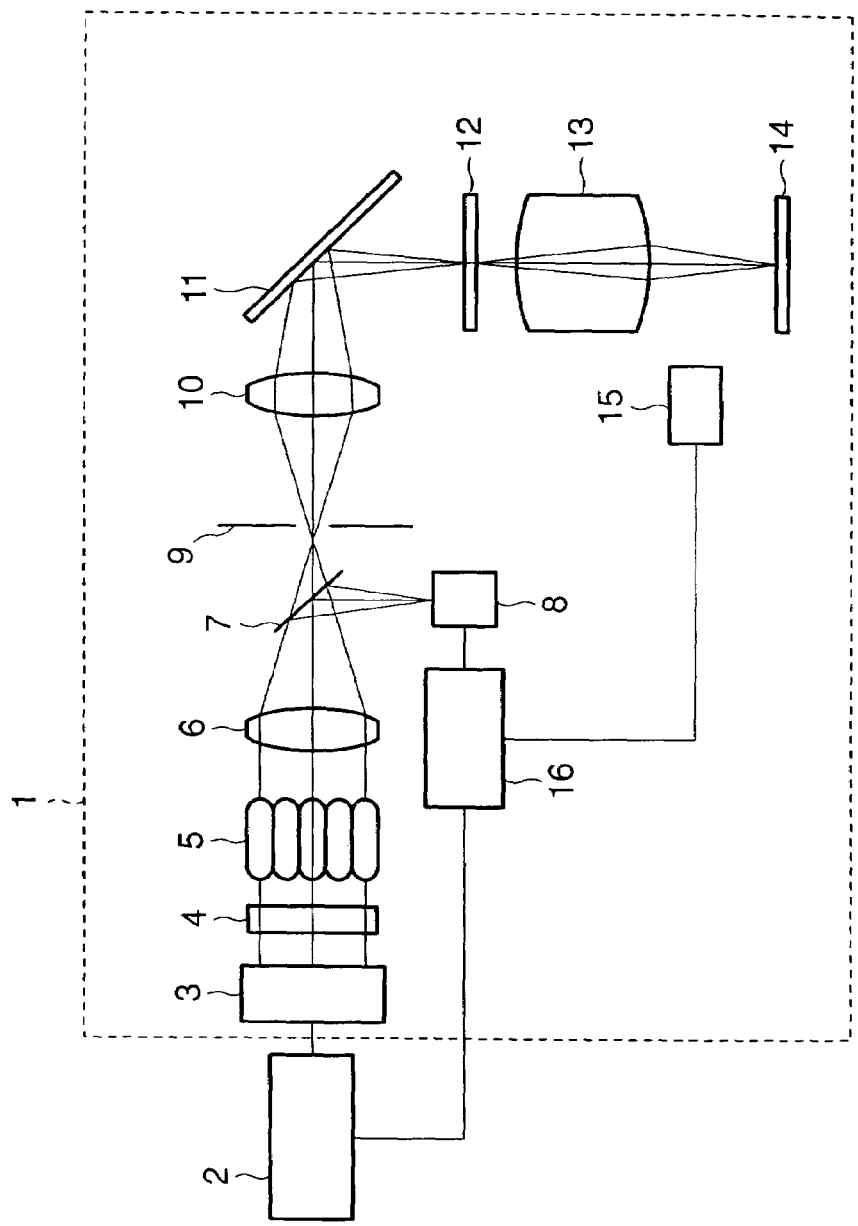
FIG. 1 is a view showing an embodiment of an exposure apparatus according to the present invention.

FIG. 1 is a view showing an embodiment of an exposure apparatus according to the present invention. In FIG. 1, reference numeral 1 denotes a known step & repeat (or step & scan) type exposure apparatus main body generally called a stepper (or scanner); and 2, a laser source using an excimer laser. Examples of the excimer laser are a KrF (wavelength: 248 nm) excimer laser and an ArF (wavelength: 193 nm) excimer laser.

The exposure apparatus main body 1 is constituted by a beam shaping optical system 3 for shaping the section of a laser beam emitted by the laser source 2 into a desired shape along the optical path of the laser beam extending from the laser source 2, a variable ND filter 4 for adjusting the intensity of the laser beam, an optical integrator 5 for splitting the laser beam and superposing the split laser beams in order to make the illuminance on the surface of a reticle 12 uniform, a condenser lens 6 for condensing the laser beams having passed through the optical integrator 5, a beam splitter 7 for guiding some of the laser beams from the condenser lens 6 to a photodetector 8, a masking blade 9 which is arranged near a position where the laser beams are condensed by the condenser lens 6 and regulates the irradiation range of the laser beam on the surface of the reticle 12, an imaging lens 10 for forming an image of the masking blade 9 onto the reticle 12, and a mirror 11 for deflecting the optical path of the laser beam toward a projection lens 13.

The reticle 12 is illuminated with a laser beam which has been emitted by the laser source 2 and has passed through an illumination optical system including these optical elements. A pattern on the reticle 12 is reduced to, e.g., ½ to ⅒ and projected (transferred) to one of a plurality of shot regions on a wafer 14 serving as a substrate via the projection lens 13 serving as a projection optical system. The wafer 14 is two-dimensionally moved along a plane perpendicular to the optical axis of the projection lens 13 by a moving stage (not shown). Every time exposure of an exposure shot region ends, the next exposure shot region is moved to a position where the pattern of the reticle 12 is projected via the projection lens 13.

Reference numeral 15 denotes a barometer for measuring the atmospheric pressure in the exposure apparatus at a predetermined time interval. The measurement value is transmitted to a main controller 16 of the exposure apparatus main body 1. The main controller 16 calculates an optimal oscillation wavelength of a laser beam (target oscillation wavelength value), and transmits a target oscillation wavelength value signal to the laser source 2 at a timing between, e.g., the end of exposure in a predetermined exposure region and the start of exposure in the next exposure region. The main controller 16 transmits a trigger signal for causing the laser source 2 to emit light. At the same time, the main controller 16 performs photoelectric conversion processing in accordance with the intensity of the laser beam detected by the photodetector 8, integrates the result to obtain an exposure amount control signal, and transmits the exposure amount control signal to the laser source 2. The laser source 2 controls its internal units on the basis of the target oscillation wavelength value signal, trigger signal, and exposure amount control signal.

The laser source 2 transmits a wavelength lock signal to the main controller 16. This signal is ON when an actual oscillation wavelength falls within a predetermined allowable range of a target oscillation wavelength value, and is otherwise OFF. When the wavelength lock signal is ON, the oscillation wavelength falls within the predetermined allowable range of the target value, and thus wafer exposure can immediately start without opening/closing operation of a shutter in the laser source 2 or test emission. When the wavelength lock signal is OFF, the main controller 16 does not expose the wafer 14, closes the shutter arranged at the exit port of the laser source 2, and performs test emission in order to make the oscillation wavelength fall within the predetermined allowable range. After the oscillation wavelength falls within the predetermined allowable range, the main controller 16 can open the shutter to start exposure again.

Figure 2:
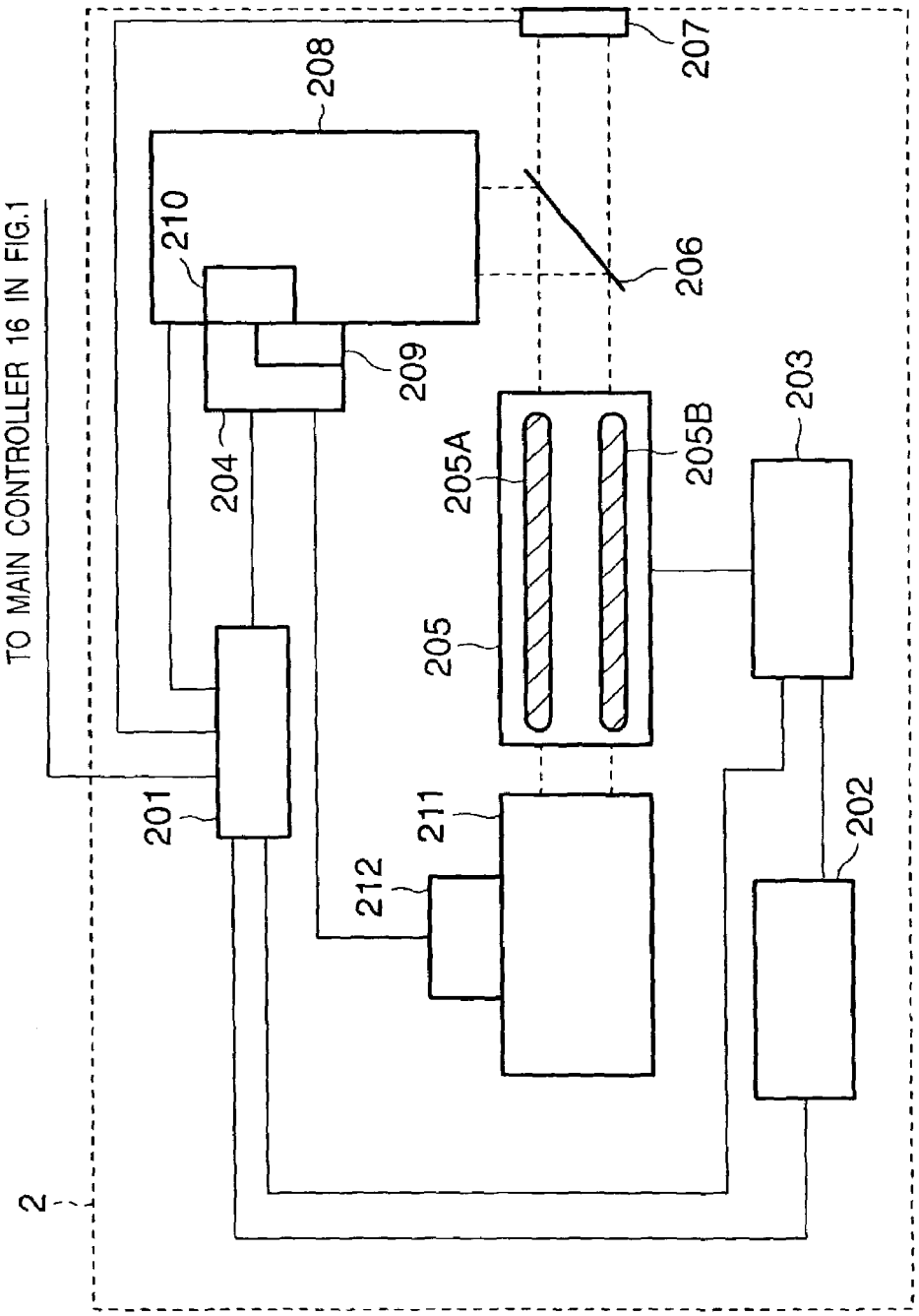
FIG. 2 is a view showing an embodiment of a laser oscillation apparatus according to the present invention.

FIG. 2 is a view showing the schematic internal arrangement of an excimer laser oscillation apparatus serving as an example of the laser source 2 shown in FIG. 1.

The target oscillation wavelength value signal, trigger signal, and exposure amount control signal transmitted from the main controller 16 of the exposure apparatus main body 1 are received by a laser controller 201. The laser controller 201 transmits a high-voltage signal to a high-voltage power supply 202, and transmits the trigger signal to a compression circuit 203 at a laser emission timing. The laser controller 201 transmits the target oscillation wavelength value signal to a wavelength controller 204. A laser chamber 205 incorporates discharge electrodes 205A and 205B. A high voltage of about 10 to 30 kV applied by the compression circuit 203 generates discharge between the discharge electrodes 205A and 205B to excite a laser gas sealed in the laser chamber 205, thereby oscillating a laser beam. An output mirror (not shown) is attached to the light exit portion of the laser chamber 205. The laser beam oscillated by the laser chamber 205 emerges to the beam shaping optical system 3 shown in FIG. 1 through a beam splitter 206 and shutter 207. Some components of the laser beam are reflected by the beam splitter 206 and guided to a light monitoring unit 208. The laser controller 201 opens/closes the shutter 207 in accordance with instructions from the main controller 16 in FIG. 1.

The light monitoring unit 208 always monitors the pulse energy and oscillation wavelength of the laser beam, and determines whether the measured pulse energy is a desired value with respect to the target exposure amount value. If the pulse energy is lower than the desired value, the laser controller 201 transmits to the high-voltage power supply circuit 202 a signal for increasing the application voltage to the discharge electrodes 205A and 205B, and if the pulse energy is higher, a signal for decreasing the application voltage. The wavelength controller 204 compares the target oscillation wavelength value transmitted from the laser controller 201 with an oscillation wavelength measured by the light monitoring unit 208, and checks whether the measured oscillation wavelength falls within a predetermined allowable range of the target oscillation wavelength value. If the oscillation wavelength falls within the predetermined allowable range, wafer exposure can immediately start without opening/closing operation of the shutter 207 or test emission. If the oscillation wavelength falls outside the predetermined allowable range, the wavelength controller 204 transmits a wavelength lock signal "OFF" to the main controller 16 in FIG. 1 via the laser controller 201. If the oscillation wavelength still falls outside the target value, the shutter 207 is closed, and the wavelength controller 204 transmits a signal for adjusting the wavelength to fall within the predetermined range to a stepping motor 212. When the oscillation wavelength falls within the predetermined allowable range of the target oscillation wavelength value, the wavelength controller 204 transmits a wavelength lock signal "ON" to the main controller 16 shown in FIG. 1 via the laser controller 201. Then, the shutter 207 is opened.

The light monitoring unit 208 incorporates an internal light monitoring unit environment measurement unit 210 such as a barometer or thermometer for measuring the internal environment of the light monitoring unit 208. The refractive index of a laser beam or the like in the internal environment of the light monitoring unit 208 can be calculated based on the measurement result. The drift amount of the light monitoring unit 208 can be calculated based on the result and corrected to always output a laser beam having a stable oscillation wavelength.

A band-narrowing module 211 is paired with the output mirror (not shown) attached to the light exit portion of the laser chamber 205, thereby constituting a laser resonator. The band-narrowing module 211 narrows the spectral line width of a laser beam to about 1 pm as a full width at half maximum. Further, the attached stepping motor 212 is driven to drive a wavelength selection element such as a grating or etalon incorporated in the band-narrowing module 211, thus changing the oscillation wavelength. At this time, the driving amount of the wavelength selection element is calculated based on the target oscillation wavelength value. The wavelength controller 204 compares the target oscillation wavelength value transmitted from the laser controller 201 with an oscillation wavelength measured by the light monitoring unit 208, and always controls the oscillation wavelength while transmitting a signal to the stepping motor 212 so as to make the oscillation wavelength of the laser beam fall within a predetermined allowable range. When the target oscillation wavelength value of the oscillation wavelength is changed again, the wavelength controller 204 drives the stepping motor 212 again so as to make the oscillation wavelength coincide with the changed target oscillation wavelength value. To change the oscillation wavelength again, the wavelength controller 204 more preferably predicts and calculates the drift amount of the oscillation wavelength of a laser beam to be oscillated next, on the basis of an oscillation history stored in an oscillation history memory 209, and drives the stepping motor 212 on the basis of the calculation result.

The experimental results of the oscillation wavelength stability of the excimer laser oscillation apparatus by the present inventors will be described.

Figure 3A:
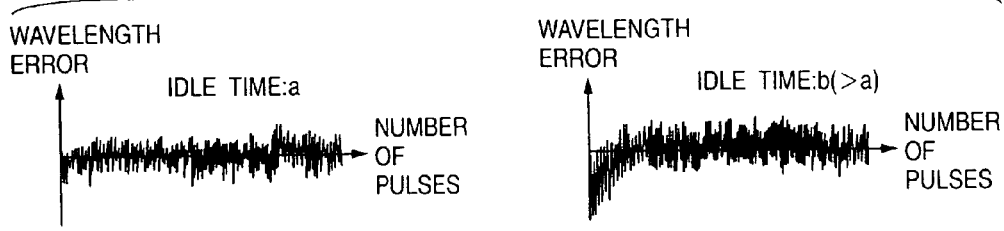
FIG. 3A is a view showing the experimental results of oscillation wavelength stability in the laser oscillation apparatus when the oscillation idle time is changed.

FIG. 3A shows data representing oscillation wavelength stability for oscillation idle times a and b (a<b) between the end of oscillation and the restart of oscillation. For the longer oscillation idle time b, the error amount with respect to the target oscillation value is larger between a restart of oscillation after the idle time and oscillation of several tens of pulses.

Figure 3B:
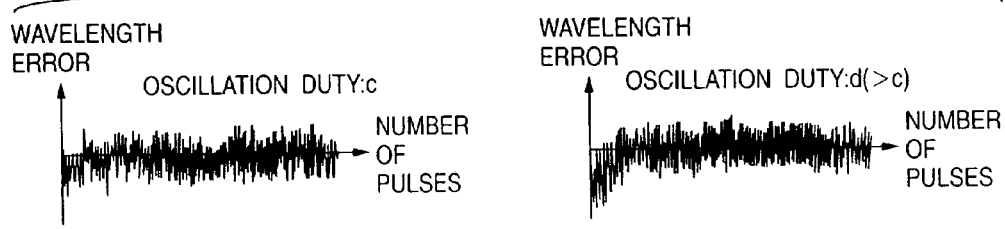
FIG. 3B is a view showing the experimental results of oscillation wavelength stability in the laser oscillation apparatus when the oscillation idle time is fixed and the oscillation duty is changed.

FIG. 3B shows data representing oscillation wavelength stability at oscillation duties c and d (c<d) before an idle time when the oscillation idle time is constant between the end of oscillation and the restart of oscillation. For the higher oscillation duty d before the idle time, the error amount with respect to the target oscillation value is larger between the restart of oscillation after the idle time and oscillation of several tens of pulses.

Figure 3C:
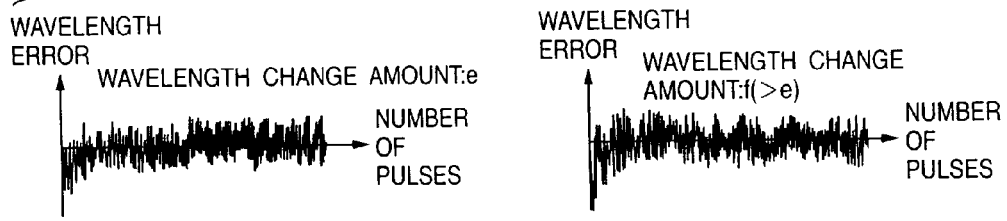
FIG. 3C is a view showing the experimental results of oscillation wavelength stability in the laser oscillation apparatus when the oscillation wavelength change amount is changed.

FIG. 3C shows data representing oscillation wavelength stability at oscillation wavelength change amounts e and f (e<f) when oscillation restarts after the end of oscillation. For the larger oscillation wavelength change amount f, the error amount with respect to the target oscillation value is larger immediately after oscillation restarts after the idle time.

In this manner, oscillation wavelength stability immediately after oscillation of a laser beam starts is unstable. Drifts of a wavelength error called chirping occur at several ten to several hundred pulses from the start of a burst in accordance with the oscillation idle time, oscillation duty, and oscillation wavelength change amount.

In the present invention, the laser controller 201 or wavelength controller 204 predicts and calculates an oscillation wavelength error amount (drift amount) generated at the start of a burst, as shown in FIGS. 3A, 3B, and 3C, and corrects and controls the stepping motor 212 so as to cancel the drift amount and always oscillate the laser beam with a desired oscillation wavelength.

An example of prediction/calculation of the oscillation wavelength drift amount can be approximately given by $$\Delta\lambda = F(\lambda exc.) + A(1 - \exp(-Bt)) + C + D \quad (1)$$

where $\Delta\lambda$: oscillation wavelength drift amount
$F(\lambda exc.)$: wavelength amount error dependent on the oscillation wavelength change amount
  A, B: coefficients (dependent on the oscillation duty and oscillation wavelength)
  t: oscillation idle time
  C: chirping
  D: drift amount of the light monitoring unit.

Figure 4:
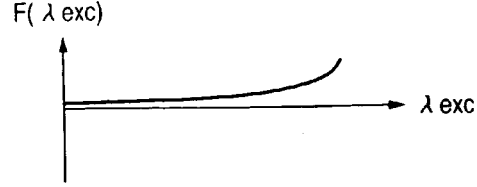
FIG. 4 is a graph showing an example of the wavelength error amount at the start of laser oscillation depending on the oscillation wavelength change amount.

In general, $F(\lambda exc.)$ in equation (1) has a larger value for a larger oscillation wavelength change amount $\lambda exc.$, as shown in FIG. 4. Chirping depends on the internal design of the laser chamber 205. During the manufacturing process of a laser oscillation apparatus, the oscillation wavelength drift amount is experimentally obtained, and $F(\lambda exc.)$, A, B, and C in equation (1) are determined and stored as parameters in the oscillation history memory 209. The refractive index of a laser beam in the internal environment of the light monitoring unit 208 is calculated based on the measurement result of the internal light monitoring unit environment measurement unit 210 such as a barometer or thermometer, and the drift amount D of the light monitoring unit 208 is used by using the calculation result. The oscillation wavelength drift amount $\Delta\lambda$ is calculated from equation (1) by using these parameters. The wavelength controller 204 drives the stepping motor 212 so as to make the oscillation wavelength fall within a predetermined allowable range from the start of a burst, and changes the oscillation wavelength to a target oscillation wavelength value.

Letting a (pm/pulse) be an oscillation wavelength change amount when one pulse is transmitted to the stepping motor 212, a laser beam can always oscillate with a wavelength falling within a desired allowable range by transmitting $\Delta\lambda/a$ (pulses) from the wavelength controller 204 to the stepping motor 212 in order to make the oscillation wavelength always fall within the desired allowable range. The step of calculating the oscillation wavelength drift amount $\Delta\lambda$ may be periodically performed when no exposure is done during the operation of the exposure apparatus.

The experiments by the present inventors show that the wavelength drift amount $\Delta\lambda$ is larger for a longer idle time after the end of oscillation. If the oscillation idle time is longer than a given time, the oscillation wavelength of a laser beam immediately after the start of oscillation is difficult to control within a predetermined allowable range, and desired exposure performance may not be achieved. To prevent this, thresholds are set for the values $F(\lambda exc.)$ and osillation idle time t in equation (1) in the laser controller 201 or wavelength controller 204. If $F(\lambda exc.)$ or osillation idle time t is larger than the threshold, a wavelength lock signal "OFF" is transmitted. If $F(\lambda exc.)$ or t is smaller than the threshold, the wavelength lock signal is kept "ON", and exposure operation is possible while the shutter 207 is kept open.

Figure 3D:
FIG. 3D is a view showing oscillation wavelength stability in the laser oscillation apparatus according to the present invention.

For the wavelength lock signal "OFF", the main controller 16 of the exposure apparatus closes the shutter 207 in the laser source 2. While emitting a test laser beam, the laser controller 201 of the laser source 2 drives the stepping motor 212 and adjusts the oscillation wavelength so as to make the oscillation wavelength fall within a predetermined allowable range. When the oscillation wavelength falls within the predetermined allowable range, the laser controller 201 transmits a wavelength lock signal "ON" to the main controller 16, which opens the shutter 207 and outputs a laser beam to the outside of the laser source 2. FIG. 3D is a view showing a state in which a laser beam can oscillate with a desired oscillation wavelength even at the start of a burst as a result of using the above control.

Figure 5:
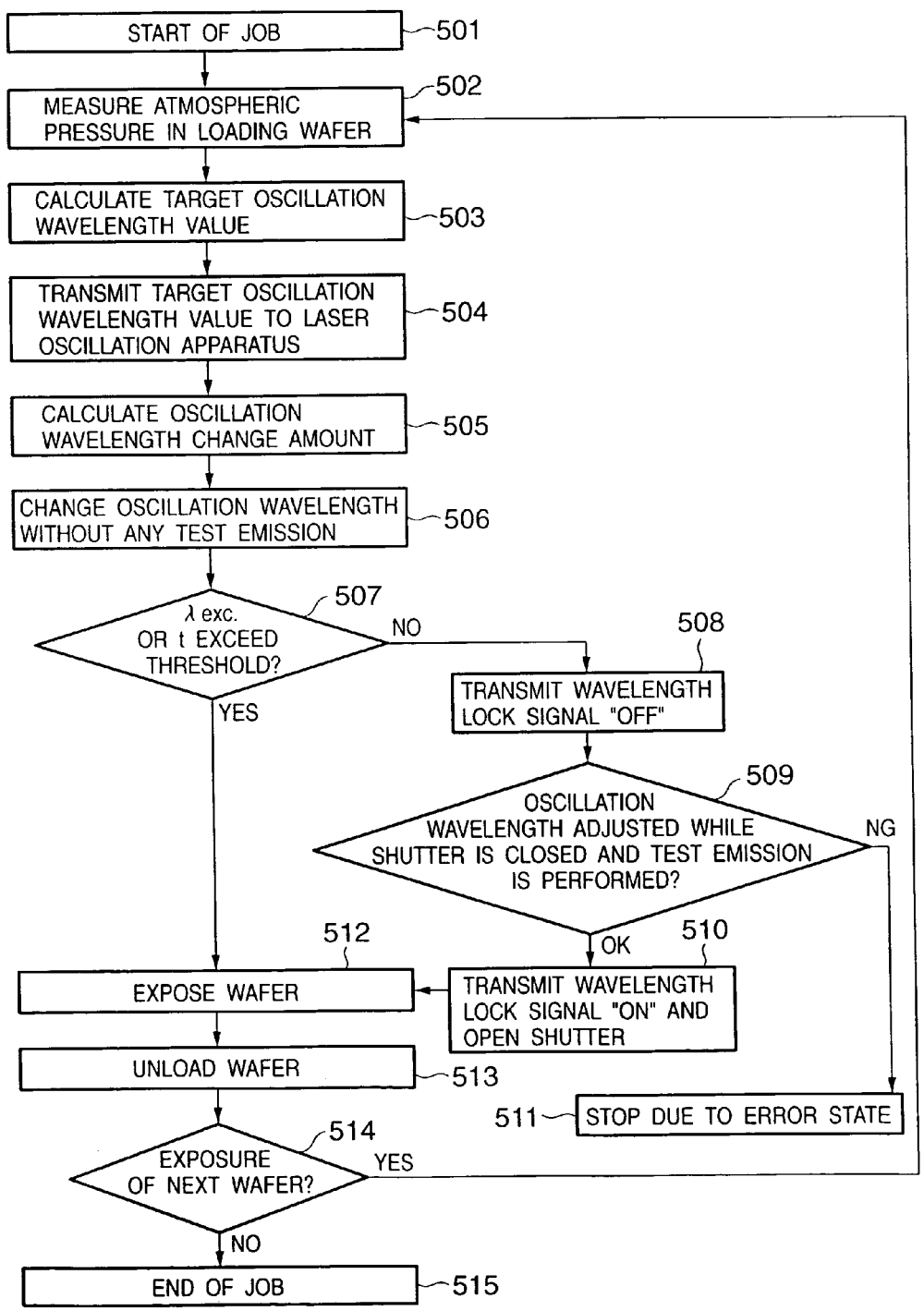
FIG. 5 is a flow chart showing a processing flow from the start to the end of a job by the exposure apparatus according to the present invention.

A processing flow in the exposure apparatus according to the present invention will be explained with reference to FIG. 5.

A job of the exposure apparatus starts (step 501), and the barometer 15 measures the atmospheric pressure at a wafer loading timing (step 502). The main controller 16 calculates a target oscillation wavelength value (step 503), and transmits it to the laser source 2 (step 504). The laser controller 201 of the laser source 2 calculates an oscillation wavelength change amount (step 505), drives the stepping motor 212 without emitting any test laser beam, and adjusts the wavelength selection element such as a grating or an etalon in the band narrowing module 211 so as to oscillate the laser beam with a desired oscillation wavelength (step 506).

Whether the oscillation wavelength change amount or laser beam oscillation idle time does not exceed its threshold is checked (step 507). If NO in step 507, exposure immediately starts without opening/closing operation of the shutter 207 or test emission.

If YES in step 507, a wavelength lock signal "OFF" is transmitted (step 508), the shutter 207 is closed, and the oscillation wavelength is adjusted to fall within an allowable range of the target value while a test laser beam is emitted (step 509). If the oscillation wavelength falls within the allowable range, the laser controller 201 transmits a wavelength lock signal "ON" to the main controller 16 of the exposure apparatus, which opens the shutter 207 (step 510). Exposure starts in response to a trigger signal from the main controller 16 of the exposure apparatus main body (step 512).

If the oscillation wavelength does not fall within the allowable range in step 509, the laser oscillation apparatus changes to an error state and stops (step 511).

After wafer exposure ends and the wafer is unloaded (step 513), whether to subsequently expose the next wafer is determined (step 514). If the next wafer is to be exposed, the flow returns to step 502. If NO in step 514, the job ends (step 515).

Figure 6:
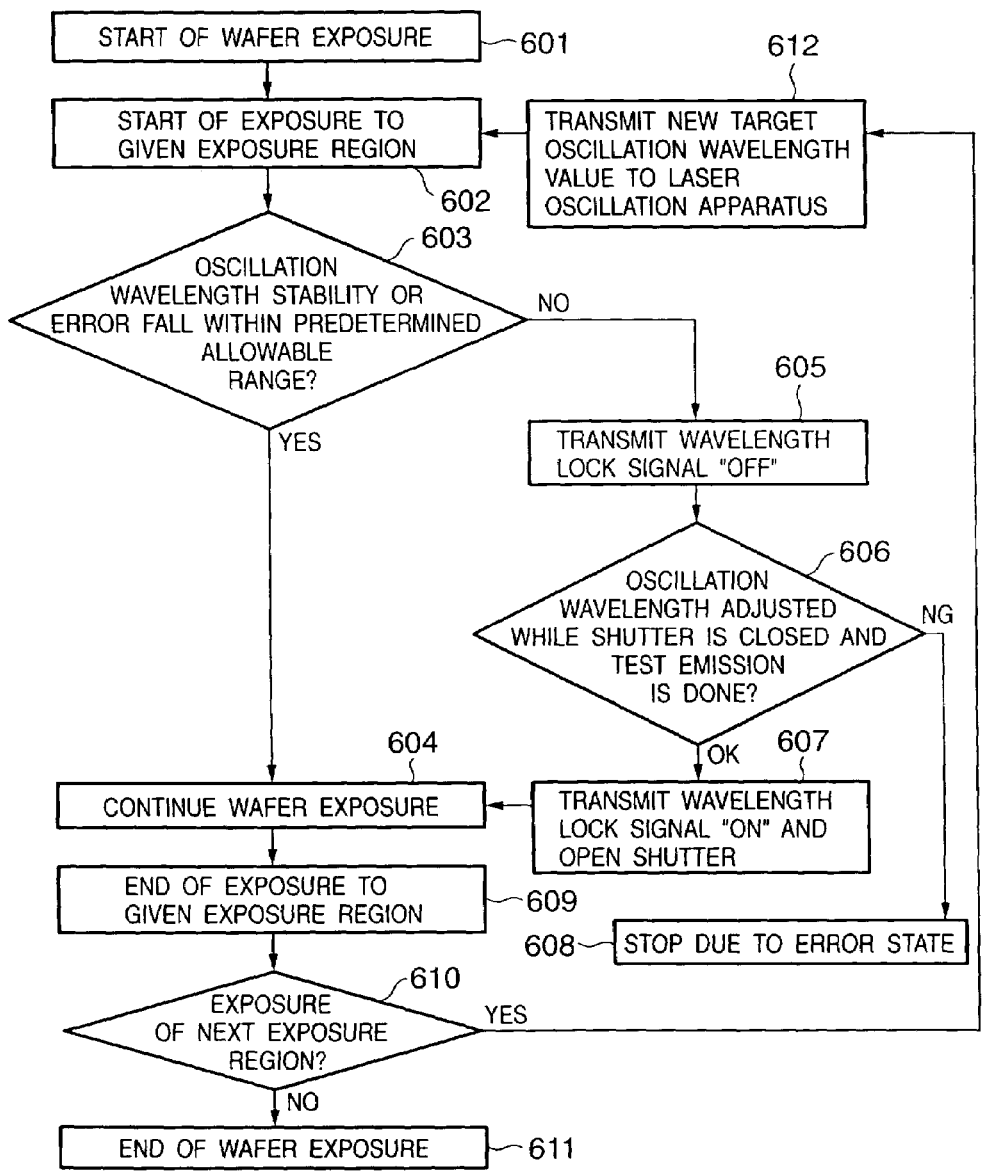
FIG. 6 is a flow chart showing a processing flow when the oscillation wavelength is changed between the end of exposure to a predetermined exposure region on a wafer and the start of exposure to the next exposure region by the exposure apparatus according to the present invention.

In this example, the oscillation wavelength is changed at the wafer loading timing. Alternatively, the oscillation wavelength may be changed between the end of exposure to a predetermined exposure region on a wafer and the start of exposure to the next exposure region. A processing flow at this time will be explained with reference to FIG. 6.

Wafer exposure starts (step 601), and exposure to a given exposure region starts (step 602). During exposure, the wavelength controller 204 of the laser source 2 always monitors whether the oscillation wavelength stability or error (difference between an actual oscillation wavelength and a target oscillation wavelength value) of an actually oscillated laser beam falls within a predetermined allowable range (step 603). As far as the oscillation wavelength stability or error falls within the allowable range, exposure continues (step 604).

If the oscillation wavelength becomes unstable and does not fall within the predetermined allowable range, a wavelength lock signal "OFF" is transmitted to interrupt exposure (step 605). The shutter 207 of the laser source 2 is closed, and the oscillation wavelength is adjusted to fall within the allowable range while a test laser beam is emitted (step 606). If the oscillation wavelength falls within the allowable range, a wavelength lock signal "ON" is transmitted in step 607, and exposure restarts (step 604). If the wavelength cannot be adjusted to fall within the allowable range in step 606, the laser source 2 changes to an error state and stops exposure (step 608).

After exposure of a certain exposure region is completed (step 609), the main controller 16 of the exposure apparatus determines whether to expose the next exposure region (step 610). If YES in step 610, the main controller 16 calculates a new target oscillation wavelength value from the measurement result of the barometer 15 in step 612, and transmits it to the laser source 2. The flow returns to step 602, and exposure to the next exposure region starts without emitting any test laser beam. If NO in step 610, wafer exposure ends (step 611), and the wafer is unloaded.

In this way, the oscillation wavelength of a laser beam is changed between the end of exposure to a predetermined exposure region on a wafer and the start of exposure to the next exposure region. This can solve the problem that all exposure regions on a wafer cannot be exposed with an optimal oscillation wavelength owing to an increase in exposure time per wafer along with a recent trend of increasing the wafer diameter.

(Embodiment of Semiconductor Production System)

A production system for producing a semiconductor device (e.g., a semiconductor chip such as an IC or LSI, liquid crystal panel, CCD, thin-film magnetic head, micromachine, or the like) using the apparatus according to the present invention will be exemplified. A trouble remedy or periodic maintenance of a manufacturing apparatus installed in a semiconductor manufacturing factory, or maintenance service such as software distribution is performed by using a computer network outside the manufacturing factory.

Figure 7:
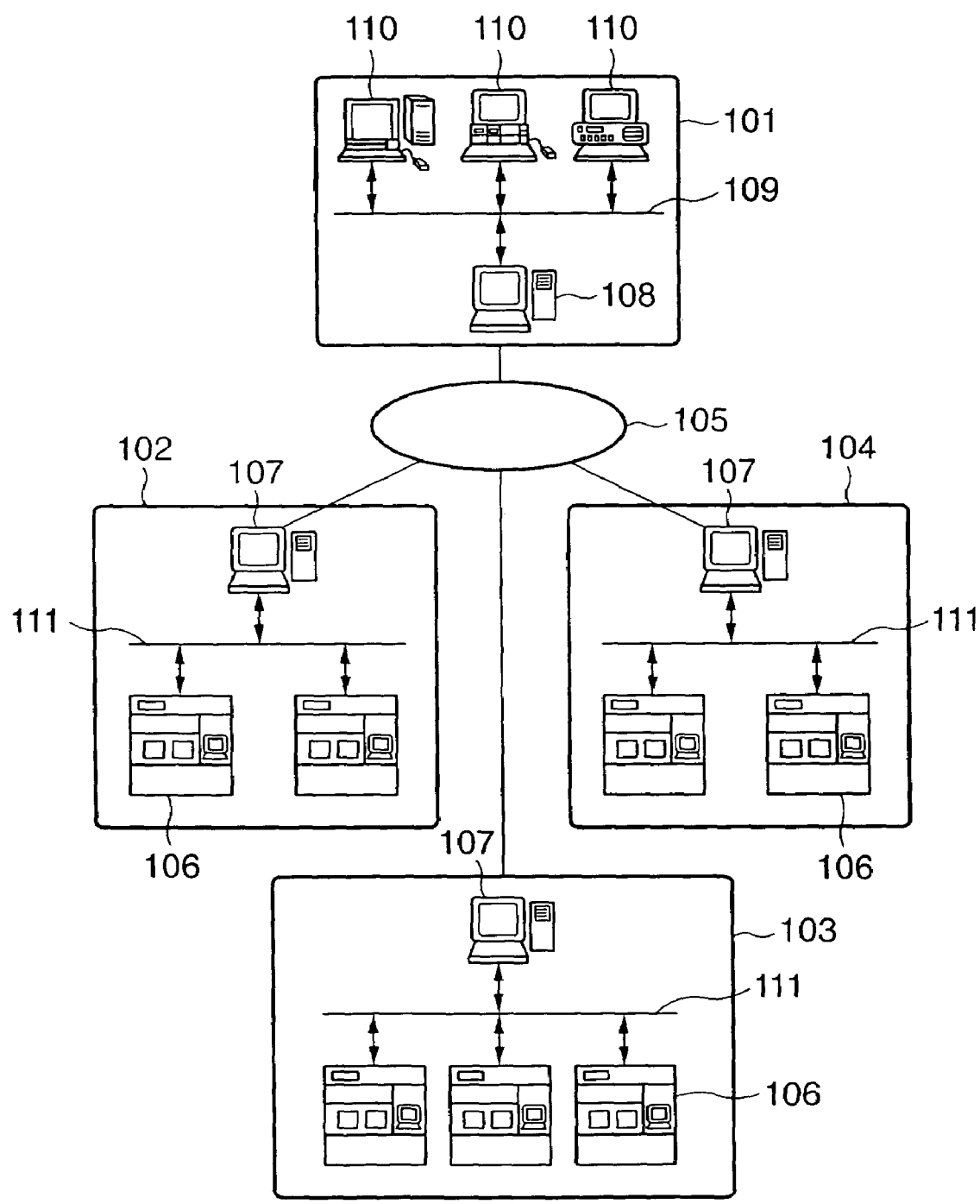
FIG. 7 is a view showing the concept of a semiconductor device production system using the apparatus according to the present invention when viewed from a given angle.

FIG. 7 shows the overall system cut out at a given angle. In FIG. 7, reference numeral 101 denotes a business office of a vendor (apparatus supply manufacturer) which provides a semiconductor device manufacturing apparatus. Assumed examples of the manufacturing apparatus are semiconductor manufacturing apparatuses for performing various processes used in a semiconductor manufacturing factory, such as pre-process apparatuses (e.g., a lithography apparatus including an exposure apparatus, a resist processing apparatus, and an etching apparatus, an annealing apparatus, a film formation apparatus, a planarization apparatus, and the like) and post-process apparatuses (e.g., an assembly apparatus, an inspection apparatus, and the like). The business office 101 comprises a host management system 108 for providing a maintenance database for the manufacturing apparatus, a plurality of operation terminal computers 110, and a LAN (Local Area Network) 109, which connects the host management system 108 and computers 110 to build an intranet. The host management system 108 has a gateway for connecting the LAN 109 to Internet 105 as an external network of the business office, and a security function for limiting external accesses.

Reference numerals 102 to 104 denote manufacturing factories of the semiconductor manufacturer as users of manufacturing apparatuses. The manufacturing factories 102 to 104 may belong to different manufacturers or the same manufacturer (e.g., a pre-process factory, a post-process factory, and the like). Each of the factories 102 to 104 is equipped with a plurality of manufacturing apparatuses 106, a LAN (Local Area Network) 111, which connects these apparatuses 106 to build an intranet, and a host management system 107 serving as a monitoring apparatus for monitoring the operation status of each manufacturing apparatus 106. The host management system 107 in each of the factories 102 to 104 has a gateway for connecting the LAN 111 in the factory to the Internet 105 as an external network of the factory.

Each factory can access the host management system 108 of the vendor 101 from the LAN 111 via the Internet 105. The security function of the host management system 108 authorizes access of only a limited user. More specifically, the factory notifies the vendor via the Internet 105 of status information (e.g., the symptom of a manufacturing apparatus in trouble) representing the operation status of each manufacturing apparatus 106, and receives response information (e.g., information designating a remedy against the trouble, or remedy software or data) corresponding to the notification, or maintenance information such as the latest software or help information.

Data communication between the factories 102 to 104 and the vendor 101 and data communication via the LAN 111 in each factory adopt a communication protocol (TCP/IP) generally used in the Internet. Instead of using the Internet as an external network of the factory, a dedicated network (e.g., an ISDN) having high security, which inhibits access of a third party can be adopted. Also the user may construct a database in addition to the one provided by the vendor and set the database on an external network, and the host management system may authorize access to the database from a plurality of user factories.

Figure 8:
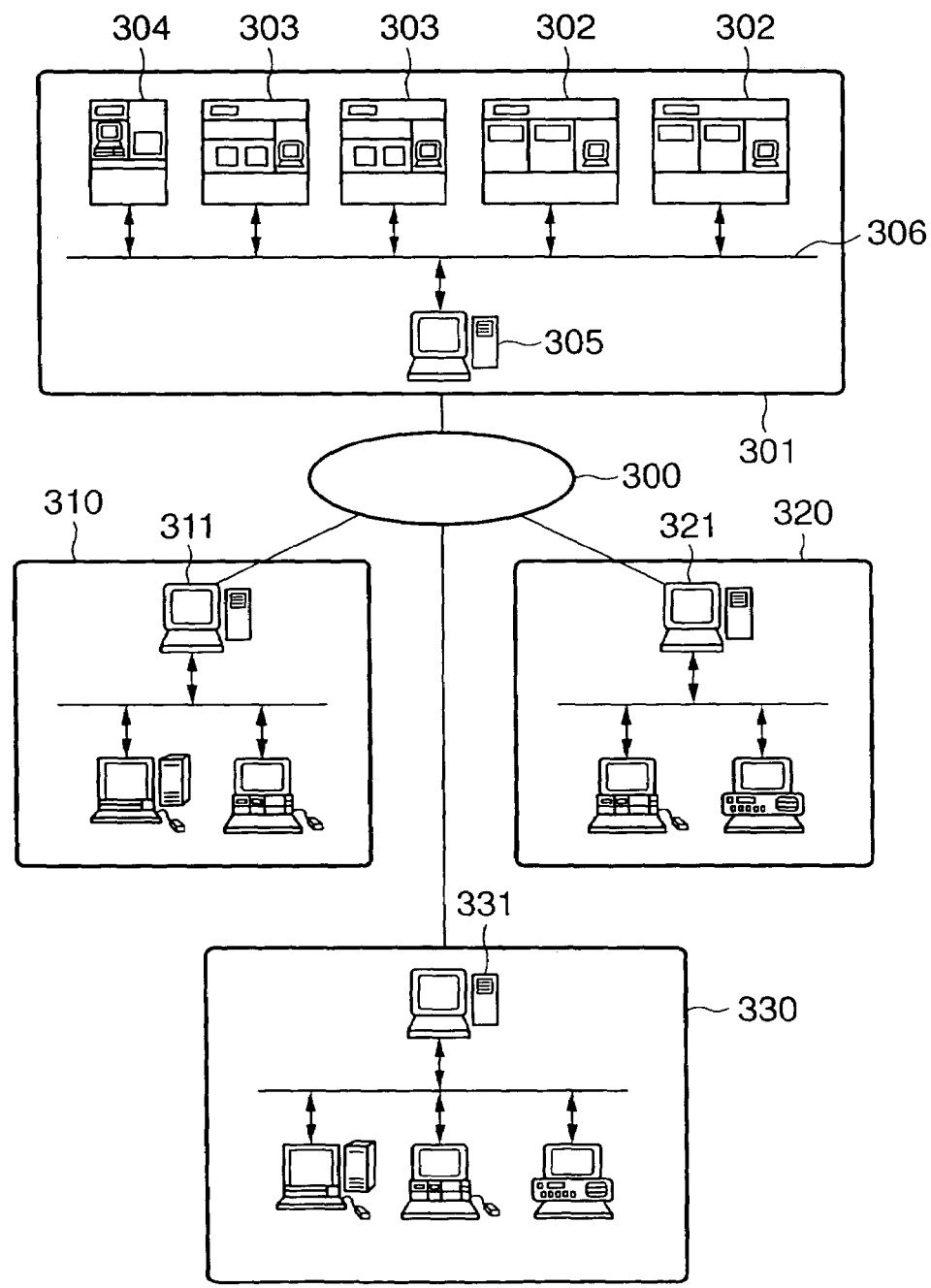
FIG. 8 is a view showing the concept of the semiconductor device production system using the apparatus according to the present invention when viewed from another angle.

FIG. 8 is a view showing the concept of the overall system of this embodiment that is cut out at a different angle from FIG. 7. In the above example, a plurality of user factories having manufacturing apparatuses and the management system of the manufacturing apparatus vendor are connected via an external network, and production management of each factory or information of at least one manufacturing apparatus is communicated via the external network. In the example of FIG. 8, a factory having manufacturing apparatuses of a plurality of vendors and the management systems of the vendors for these manufacturing apparatuses are connected via the external network of the factory, and maintenance information of each manufacturing apparatus is communicated.

In FIG. 8, reference numeral 301 denotes a manufacturing factory of a manufacturing apparatus user (e.g., a semiconductor device manufacturer) where manufacturing apparatuses for performing various processes, e.g., an exposure apparatus 302 a resist processing apparatus 303, and a film formation apparatus 304 are installed in the manufacturing line of the factory. FIG. 8 shows only one manufacturing factory 301, but a plurality of factories are networked in practice. The respective apparatuses in the factory are connected to a LAN 306 to build an intranet, and a host management system 305 manages the operation of the manufacturing line.

The business office vendors (e.g., apparatus supply manufacturers) such as an exposure apparatus manufacturer 310, a resist processing apparatus manufacturer 320, and a film formation apparatus manufacturer 330 comprise hose management system 311, 321, and 331 for executing remote maintenance for the supplied apparatuses. Each host management system has a maintenance database and a gateway for an external network, as described above. The host management system 305 for managing the apparatuses in the manufacturing factory of the user, and the management systems 311, 321, and 331 of the vendors for the respective apparatuses are connected via the Internet or dedicated network serving as an external network 300. If a trouble occurs in any one of a series of manufacturing apparatuses along the manufacturing line in this system, the operation of the manufacturing line stops. This trouble can be quickly solved by remote maintenance from the vendor of the apparatus in trouble via the Internet 300. This can minimize the stoppage of the manufacturing line.

Each manufacturing apparatus in the semiconductor manufacturing factory comprises a display, a network interface, and a computer for executing network access software and apparatus operating software, which are stored in a storage device.

Figure 9:
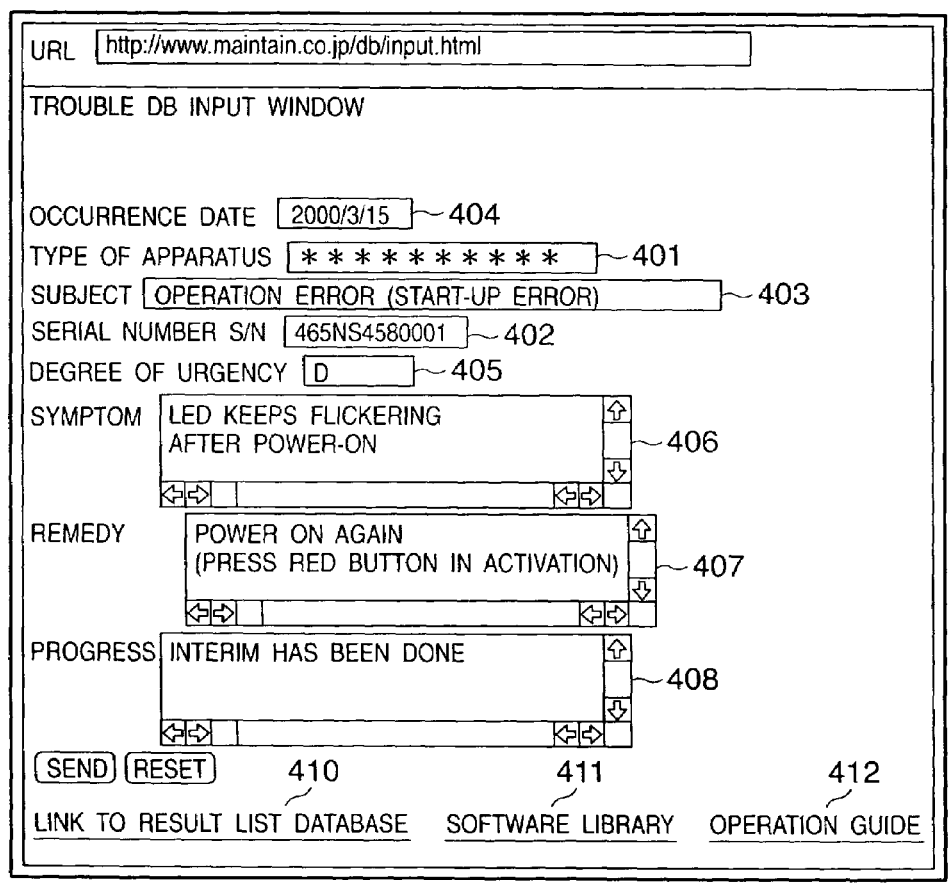
FIG. 9 is a view showing an example of a user interface.

The storage device is a built-in memory, hard disk, or network file server. The network access software includes a dedicated or general-purpose web browser, and provides a user interface having a window as shown in FIG. 9 on the display. While referring to this window, the operator who manages manufacturing apparatuses in each factory inputs, in input items on the windows, pieces of information such as the type of manufacturing apparatus 401, serial number 402, subject of trouble 403, occurrence date 404, degree of urgency 405, symptom 406, remedy 407, and progress 408.

The pieces of input information are transmitted to the maintenance database via the Internet, and appropriate maintenance information is sent back from the maintenance database and displayed on the display. The user interface provided by the web browser realizes hyperlink functions 410 to 412, as shown in FIG. 9. This allows the operator to access detailed information of each item, receive the latest-version software to be used for a manufacturing apparatus from a software library provided by a vendor, and receive an operation guide (help information) as a reference for the operator in the factory. Maintenance information provided by the maintenance database also includes information concerning the present invention described above. The software library also provides the latest software for implementing the present invention.

Figure 10:
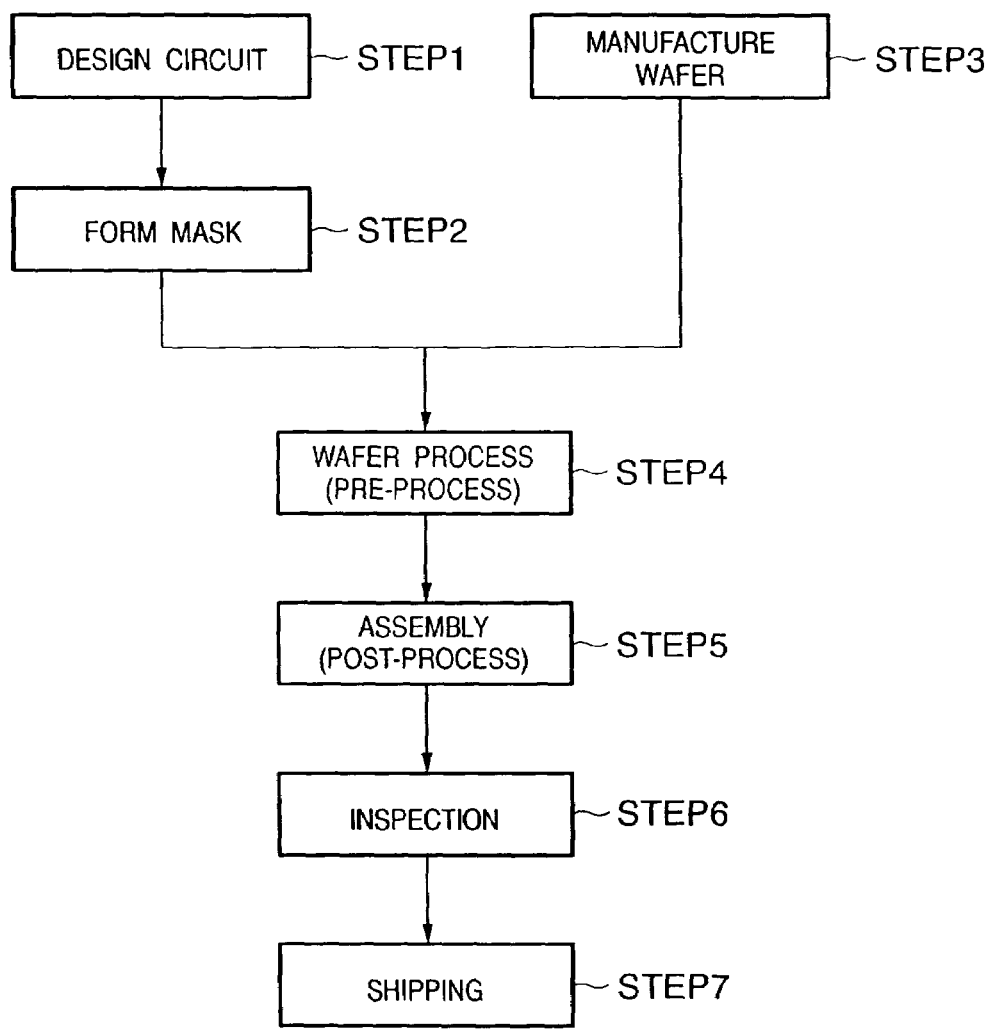
FIG. 10 is a flow chart for explaining the processing flow of a device manufacturing process.

A semiconductor device manufacturing process using the above-described production system will be explained. FIG. 10 shows the flow of the whole manufacturing process of the semiconductor device. In step 1 (circuit design), a semiconductor device circuit is designed. In step 2 (mask formation), a mask having the designed circuit pattern is formed. In step 3 (wafer manufacture), a wafer is manufactured by using a material such as silicon. In step 4 (wafer process) called a pre-process, an actual circuit is formed on the wafer by lithography using a prepared mask and the wafer. Step 5 (assembly) called a post-process is the step of forming a semiconductor chip by using the wafer manufactured in step 4, and includes an assembly process (dicing and bonding) and packaging process (chip encapsulation). In step 6 (inspection), inspections such as the operation confirmation test and durability test of the semiconductor device manufactured in step 5 are conducted. After these steps, the semiconductor device is completed and shipped (step 7). For example, the pre-process and post-process are performed in separate dedicated factories, and maintenance is done for each of the factories by the above-described remote maintenance system. Information for production management and apparatus maintenance is communicated between the pre-process factory and the post-process factory via the Internet or dedicated network.

Figure 11:
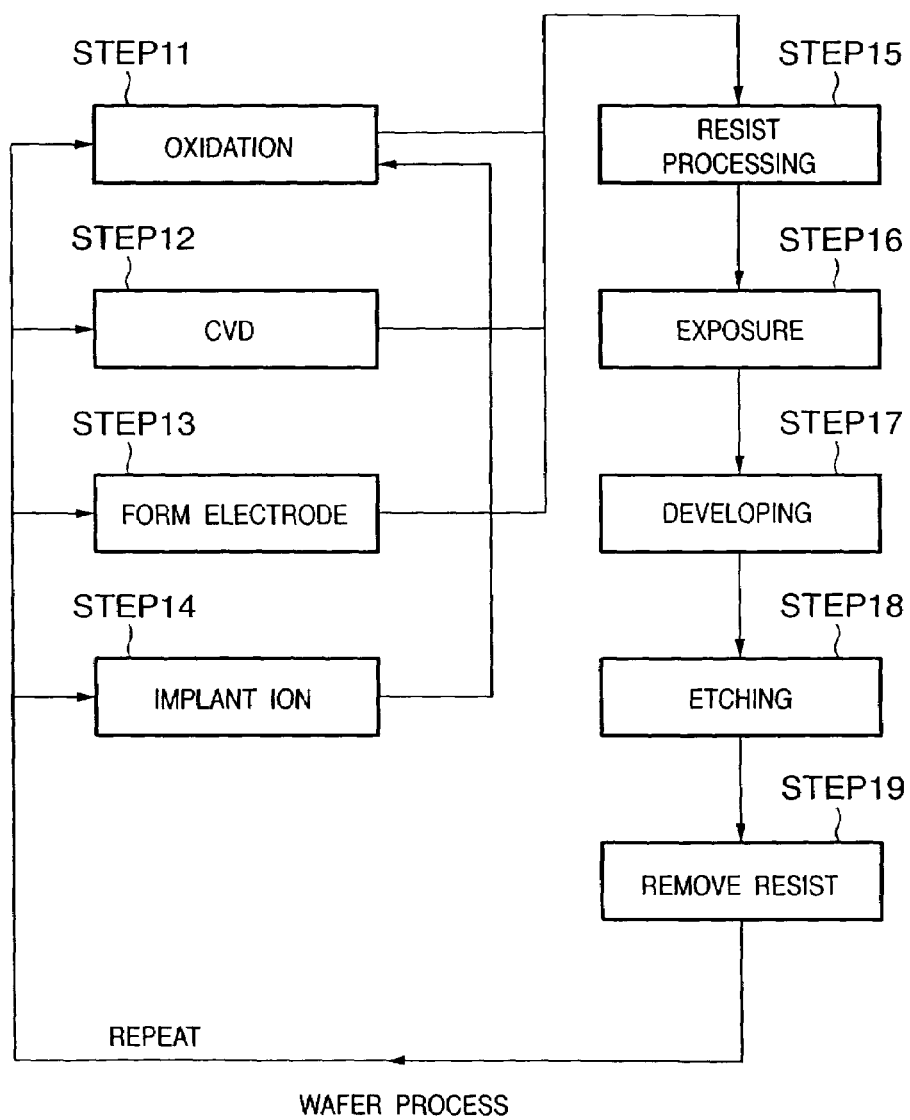
FIG. 11 is a flow chart for explaining a wafer process.

FIG. 11 shows the detailed flow of the wafer process. In step 11 (oxidation), the wafer surface is oxidized. In step 12 (CVD), an insulating film is formed on the wafer surface. In step 13 (electrode formation), an electrode is formed on the wafer by vapor deposition. In step 14 (ion implantation), ions are implanted in the wafer.

In step 15 (resist processing), a photosensitive agent is supplied to the wafer. In step 16 (exposure), the above-mentioned exposure apparatus exposes the wafer to the circuit pattern of a mask. In step 17 (developing), the exposed wafer is developed. In step 18 (etching), the resist is etched except for the developed resist image. In step 19 (resist removal), an unnecessary resist after etching is removed. These steps are repeated to form multiple circuit patterns on the wafer. A manufacturing apparatus used in each step undergoes maintenance by the remote maintenance system, which prevents trouble in advance. Even if trouble occurs, the manufacturing apparatus can be quickly recovered. The productivity of the semiconductor device can be increased in comparison with the prior art.

As has been described above, the present invention can always expose a wafer to a circuit pattern with high precision without decreasing the productivity of an exposure apparatus which uses a laser oscillation apparatus as a light source.

As many apparently widely different embodiments of the present invention can be made without departing from the spirit and scope thereof, it is to be understood that the invention is not limited to the specific embodiments thereof except as defined in the appended claims.

What is claimed is:

1. A laser oscillation apparatus for providing a laser beam, said apparatus comprising:
   a wavelength selection element;
   calculation means for calculating a driving amount of said wavelength selection element on the basis of a target oscillation wavelength value;
   wavelength change means for driving said wavelength selection element on the basis of the calculated driving amount of the wavelength selection element in order to change an oscillation wavelength of the laser beam to the target oscillation wavelength value;
   oscillation history memory means for storing an oscillation idle time of the laser beam or an oscillation duty as an oscillation history,
   wherein, said calculation means is operable to calculate the driving amount on the basis of the oscillation history.

2. The apparatus according to claim 1, further comprising wavelength measurement means for measuring the oscillation wavelength of the laser beam.

3. The apparatus according to claim 2, wherein
   the apparatus further comprises internal environment measurement means for measuring an internal environment of said wavelength measurement means, and
   said wavelength measurement means is corrected based on the measured internal environment of said wavelength measurement means.

4. The apparatus according to claim 3, wherein the internal environment of said wavelength measurement means includes at least one of a temperature and an atmospheric pressure.

5. The apparatus according to claim 1, wherein the wavelength selection element includes one of a grating and an etalon.

6. The apparatus according to claim 1, wherein the laser beam includes an excimer laser beam.

7. An exposure apparatus using a laser oscillation apparatus as a light source for producing a laser beam, wherein the laser oscillation apparatus comprises:
   a wavelength selection element;
   calculation means for calculating a driving amount of said wavelength selection element on the basis of a target oscillation wavelength value; and
   wavelength change means for driving said wavelength selection element and on the basis of the calculated driving amount of the wavelength selection element in order to change an oscillation wavelength of the laser beam to the target oscillation wavelength value,
   wherein, said calculation means is operable to calculate the driving amount on the basis of the oscillation history.

8. The apparatus according to claim 7, wherein
   the exposure apparatus further comprises a display, a network interface, and a computer network for executing network software, and
   maintenance information of the exposure apparatus can be communicated via the computer network.

9. The apparatus according to claim 8, wherein the network software is connected to an external network of a factory where the exposure apparatus is installed, provides on said display a user interface for accessing a maintenance database provided by a vendor or user of the exposure apparatus, and enables obtaining information from the database via the external network.

10. The apparatus according to claim 1, wherein said calculation means calculates (i) a drift amount of the oscillation wavelength generated immediately after oscillation starts on the basis of the oscillation history and (ii) the driving amount of said wavelength selection element on the basis of the drift amount.

* * * * *